United States Patent
Hawley

[19]

[11] Patent Number: 5,909,858
[45] Date of Patent: Jun. 8, 1999

[54] SPANWISE TRANSITION SECTION FOR BLENDED WING-BODY AIRCRAFT

[75] Inventor: Arthur V. Hawley, Huntington Beach, Calif.

[73] Assignee: McDonnell Douglas Corporation, St. Louis, Mo.

[21] Appl. No.: 08/878,623

[22] Filed: Jun. 19, 1997

[51] Int. Cl.[6] .................................................. B64C 3/00
[52] U.S. Cl. ........................... 244/36; 244/45 R; 244/130
[58] Field of Search .............................. 244/13, 36, 119, 244/130, 45 R

[56] References Cited

U.S. PATENT DOCUMENTS

| 1,843,678 | 2/1932 | Jannin | 244/36 |
| 1,862,102 | 6/1932 | Stout | 244/119 |
| 2,118,254 | 5/1938 | Loedding | 244/36 |
| 2,332,648 | 10/1943 | Knight | 244/119 |
| 2,650,780 | 9/1953 | Northrop et al. | 24/36 |

FOREIGN PATENT DOCUMENTS 545909  6/1942  United Kingdom ..................... 244/36

*Primary Examiner*—Galen L. Barefoot
*Attorney, Agent, or Firm*—Westerlund & Powell, PC; Robert A. Westerlund; Ramon R. Hoch

[57] ABSTRACT

A blended wing-body aircraft includes a central body, a wing, and a transition section which interconnects the body and the wing on each side of the aircraft. The two transition sections are identical, and each has a variable chord length and thickness which varies in proportion to the chord length. This enables the transition section to connect the thin wing to the thicker body. Each transition section has a negative sweep angle.

20 Claims, 3 Drawing Sheets

SPANWISE TRANSITION SECTION FOR BLENDED WING-BODY AIRCRAFT

This invention was made under Contract No. NAS1-20275 awarded by NASA. The government has certain rights in this invention.

BACKGROUND OF THE INVENTION

The present invention relates generally to aircraft and, more particularly, to a spanwise transition section having a negative sweep angle which interconnects the body and the wing of a blended wing-body aircraft.

There are primarily two types of aircraft configurations: the more common (conventional) configuration which includes a tail section comprised of vertical and horizontal stabilizers located at the aft end of a tubular fuselage; and the tailless configuration. As to the latter, there are two subtypes: a first type which has no central body, commonly known as a "flying wing," and a second type having a central body which is blended into laterally extending wings, commonly referred to as a "blended wing-body" aircraft.

A generic example of a conventional aircraft having a tail section is schematically shown in FIG. 1, and designated as aircraft 20. Aircraft 20 includes tubular fuselage 21, wing 23, horizontal stabilizer 25, and vertical stabilizer 27. When loaded, aircraft 20 has center of gravity 29. Horizontal stabilizer 25 controls the rotation of aircraft 20 about the pitch axis passing through center of gravity 29. Vertical stabilizer 27 controls the rotation of aircraft 20 about the vertical, or "yaw," axis passing through center of gravity 29.

The vector L represents the lift generated by wing 23. The additional lift generated by fuselage 21 is small in comparison to the lift generated by wing 23, and will be ignored for the limited purpose of this brief discussion. The vector l represents the lift generated by horizontal stabilizer 25. L acts in the upward, or positive direction, while l acts in the opposite, or negative direction. L has a magnitude much larger that of l. The angle of attack of aircraft 20 is controlled and stabilized by the pitch moments about center of gravity 29 generated by L and l.

The necessary presence of horizontal stabilizer 25 and vertical stabilizer 27 causes a significant increase in the drag coefficient for aircraft 20 in comparison to what the drag coefficient would be in the absence of the two aforementioned control elements. Another drawback inherent to aircraft 20 is the weight of fuselage 21, which serves to provide a pitch moment arm of sufficient length to allow the pitch rotation of aircraft 20 to be controlled by the lift l generated by horizontal stabilizer 25, as well as to provide a yaw moment arm of sufficient length to allow the yaw rotation of aircraft 20 to be controlled by the force vector generated by vertical stabilizer 27.

Also, in order to sustain flight, L must have a magnitude sufficient to lift both wing 23 and fuselage 21. L must thus exceed the weight of wing 23. As a consequence, wing 23 will be subjected to a resultant upward force equal to L minus the weight of wing 23. This resultant force subjects wing 23 to a bending moment, with the maximum moment occurring at the wing root where wing 23 joins fuselage 21.

Wing 23 must be designed to withstand this bending moment induced by the resultant force, in addition to the dynamic forces and moments created by aircraft maneuvers. More particularly, wing 23 must be designed stronger than would be the case in the absence of the aforementioned resultant force, and this strengthening requires more structural weight than would otherwise be required. The strengthening of wing 23 also typically takes up additional volume that might otherwise by utilized to carry fuel. Both of the foregoing factors reduce the range of aircraft 20.

The foregoing drawbacks inherent to conventional aircraft designs exemplified by aircraft 20 have led aeronautical engineers to consider tailless designs. A perspective view of tailless aircraft 30, a generic example of a tailless aircraft, is shown in FIG. 2. Aircraft 30 includes main wing section 31, deflectable reflexes 33, deflectable flaps 35, wing tip 37, and center of gravity 39.

FIG. 3 provides a side view of wing tip 37 and depicts reflex 33 in greater detail. Main wing section 31 generates upward, or positive, lift vector L, whereas each reflex 33 generates a lift vector l acting in the opposite, or negative, direction. The flight of tailless aircraft 30 is controlled and stabilized by the appropriate deflections of flaps 35 and reflexes 33.

As may be discerned by cursory inspection of FIG. 3, tailless aircraft 30 has no horizontal and vertical stabilizers projecting into the ambient airstream, and thus has a lower drag coefficient than aircraft 20. Moreover, since the flight of aircraft 30 is controlled and stabilized without horizontal and vertical stabilizers, it does not require the moment arm to the aforementioned stabilizers otherwise provided by a fuselage. The absence of a fuselage further lowers the drag coefficient and weight of tailless aircraft 30 in comparison to aircraft 20. Wing section 31 also realizes a savings in weight compared to wing 23 of aircraft 20 because it need not be designed to withstand the moment generated by having to lift a fuselage in addition to its own weight.

Though offering the aforementioned advantages over aircraft having fuselages and tail sections, tailless aircraft suffer from several inherent design problems. To begin with, with the tailless aircraft 30, the pitch moment arm from center of gravity 39 to the negative lift l generated by reflexes 33 is shorter than the corresponding pitch moment arm for conventional aircraft 20 between center of gravity 29 and the negative lift l generated by horizontal stabilizer 25. This renders aircraft 30 more sensitive to changes in the axial station of center of gravity 39, for example, due to a shift in the location of cargo or fuel during flight, or the placement of cargo during loading on the ground.

Alternatively stated, the aerodynamic envelope for stable and controlled flight for tailless aircraft 30 is narrower and thus will tolerate less movement of loaded center of gravity 39, in comparison to the wider envelope for conventional aircraft 20. This characteristic makes it more challenging to design a commercial airliner using a tailless aircraft because it is difficult to consistently and accurately predict the load and to control the seating location of the passengers on a commercial passenger flight, in comparison to a flight carrying only cargo, weapons or military personnel.

Tailless aircraft share a further shortcoming that arises from the commercial realities facing airlines and the designers and builders of commercial airliners. More particularly, modem commercial airliners are typically designed and built as one model in a family of derivative configurations. For conventional aircraft exemplified by aircraft 20, each model varies primarily in the length of its tubular fuselage, with the various family members sharing a similar wing and avionics. By using different members of a manufacturer's family of airliners, the airline company's pilots, mechanics, and other support personnel need only acquire detailed knowledge of one model in the family. They are subsequently able to fly, maintain and repair another model in the same family with substantially less instruction and training than would be required to acquire proficiency with a completely new and unfamiliar aircraft.

The primary means of creating a new model from an existing aircraft is by inserting a hollow axial plug having the identical diameter of the original fuselage, into the fuselage. This increases the size of the original aircraft and avoids the significant investment necessary to develop a completely new model. An airline company will select a model based on the predicted passenger load and the length of the route the aircraft is to service.

Since a tailless aircraft obviously does not have a fuselage whose length can be readily changed, this design does not lend itself to such a relatively straightforward modification which would allow a manufacturer to inexpensively modify a tailless base model and develop a family of airliners to satisfy the market driven requirements of the airline companies. The foregoing characteristic inherent to the configuration of tailless aircraft has impeded the commercial development of a tailless aircraft in spite of its considerable aerodynamic efficiency.

Based on the foregoing, it can be appreciated that there presently exists a need for a tailless aircraft which overcomes the above described disadvantages and shortcomings of the tailless aircraft of the prior art. The present invention facilitates the design of such an aircraft, and thereby fulfills this need in the art.

SUMMARY OF THE INVENTION

The present invention encompasses a spanwise transition section for a type of tailless aircraft known as a blended wing-body aircraft. The transition section is located between the aircraft's central body and the wing lying outboard of the transition section. The transition section has a negative sweep angle, in contrast to the positive sweep angle of the wing and the body.

The negative sweep angle of the transition section allows the leading edge to remain straight from the wing tip to the aircraft body, thereby providing beneficial aerodynamic characteristics. Furthermore, the foregoing feature positions the wing as far forward as possible relative to the body, thereby improving the aircraft's balance and stability by moving the aircraft's empty center of gravity as far forward as possible.

The use of passenger bay modules enables a family of related blended wing-body models to be easily developed from a basic model. The blended wing-body configuration also allows the designer to place the engines at the aft end of the body, thereby reducing the noise and vibration affecting the passenger compartment from the levels that would have to be damped in a tailless airliner having wing mounted engines.

BRIEF DESCRIPTION OF THE DRAWINGS

These and various other features and advantages of the present invention will become more readily apparent from the following detailed description taken in conjunction with the accompanying drawings, in which.

DETAILED DESCRIPTION OF THE INVENTION

Figure 2:
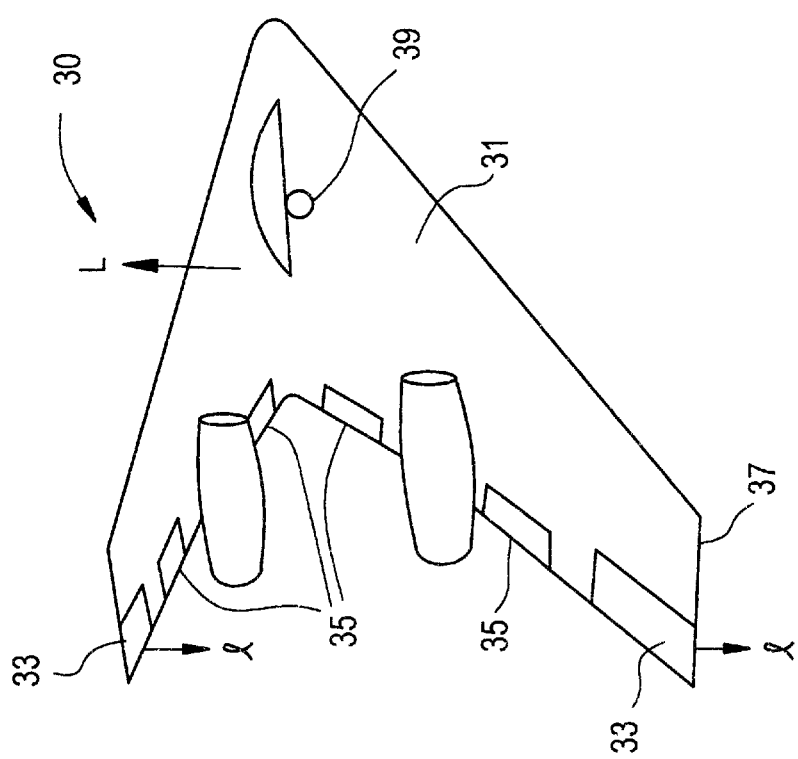
FIG. 2 is a perspective drawing of a tailless aircraft commonly referred to as a "flying wing;"
Figure 1:
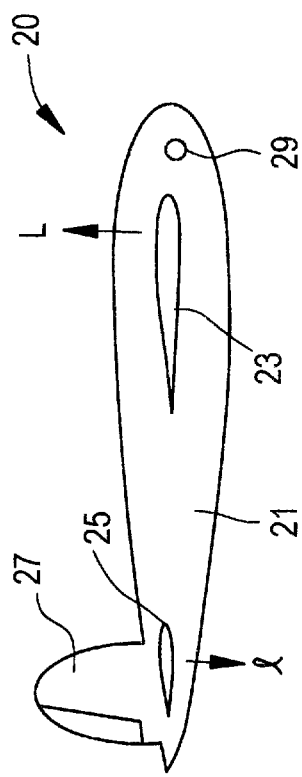
FIG. 1 is a schematic drawing of a conventional aircraft having a tubular fuselage and an attached tail section.
Figure 3:
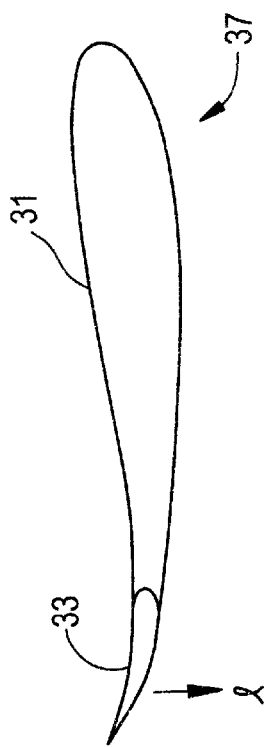
FIG. 3 is a side view of a wing tip of the "flying wing" shown in FIG. 2, depicting the reflex thereof in greater detail.
Figure 4:
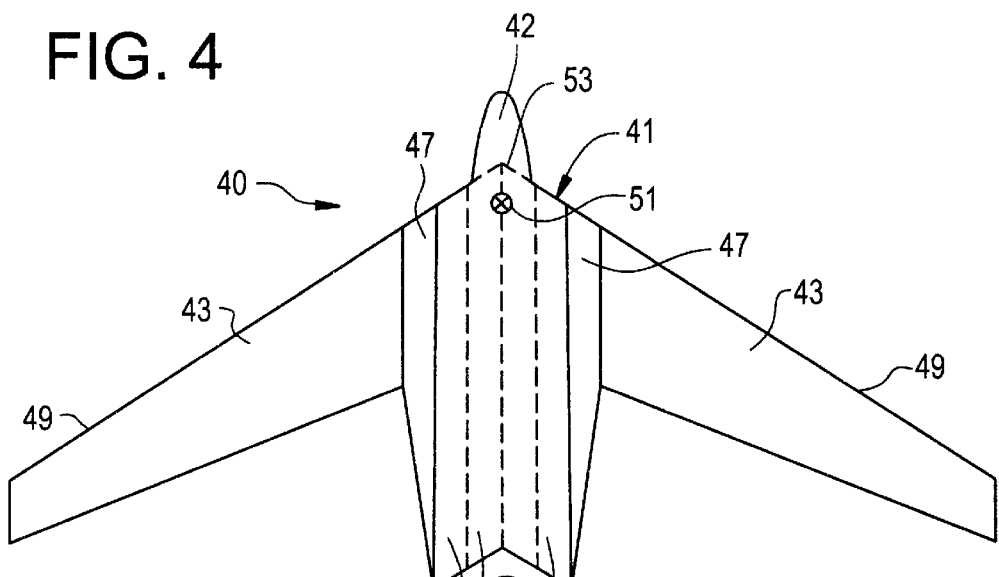
FIG. 4 is a schematic drawing providing a top view of a blended wing-body aircraft, including the transition section of the present invention.

FIG. 4 is a schematic drawing providing a top view of blended wing-body aircraft 40, which is a type of tailless aircraft. Blended wing-body aircraft 40 includes body 41, nose 42, wings 43, transition sections 47, leading edges 49, center of gravity 51, and centerline 53. Transition sections 47 are identical, and each constitutes a preferred embodiment of the present invention.

Figure 5:
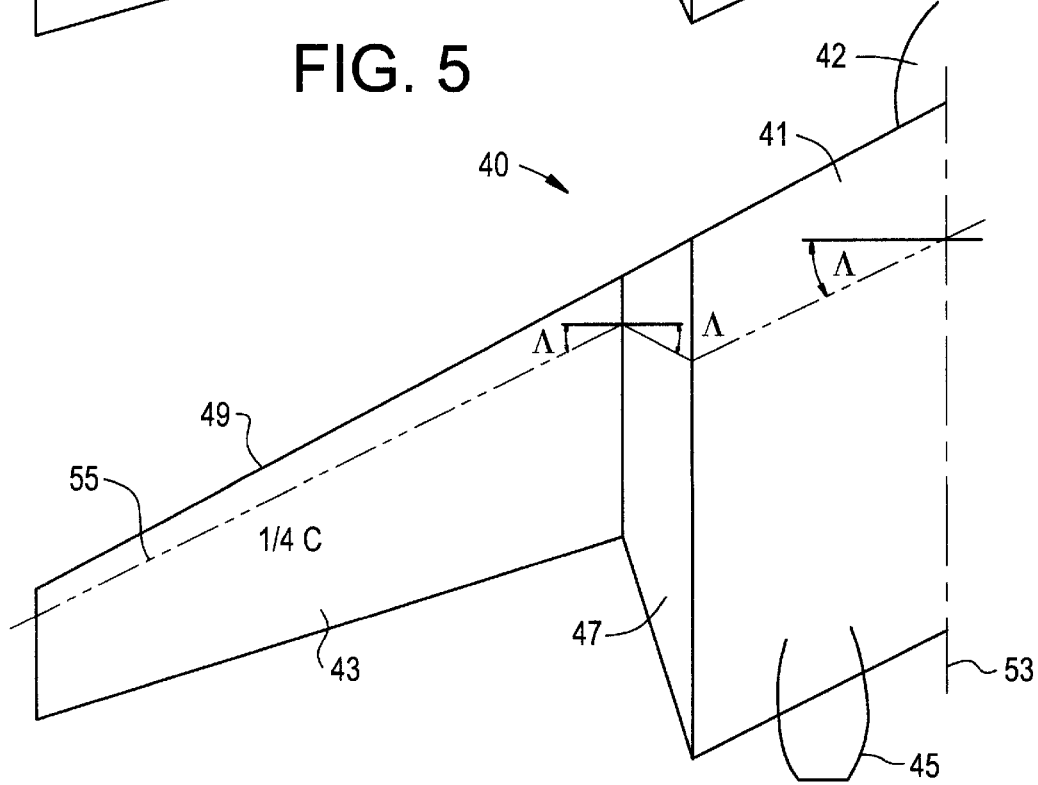
FIG. 5 is a schematic drawing providing a top view of the left half of the blended wing-body aircraft shown in FIG. 4.

FIG. 5 is an enlarged top view of the left half of aircraft 40. Transition section 47 is located between and thus provides a transition between body 41 and wing 43. More particularly, transition section 47 is connected to and located outboard of body 41, and is also connected to and located inboard of wing 43. One quarter chord line 55 is shown in FIG. 5, and constitutes the center of pressure for subsonic flow. Sweep angle $\Lambda$ of one quarter chord line 55 is shown therein, and is defined as the angle between one quarter chord line 55 and the perpendicular to centerline 53. $\Lambda$ is positive and has the same value for body 41 and wing 43. However, $\Lambda$ is negative for transition section 47, and does not necessarily equal the magnitude of $\Lambda$ for body 41 and wing 43.

Figure 6:
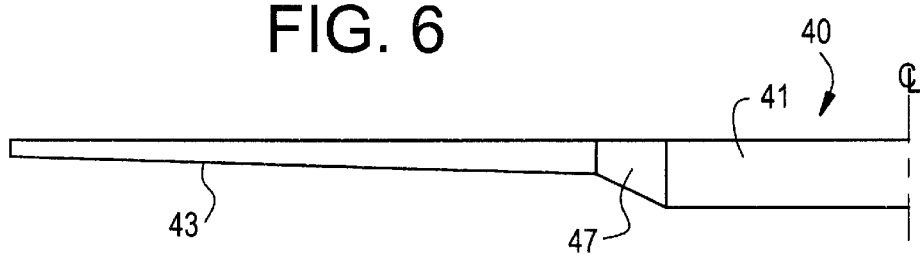
FIG. 6 is a schematic drawing providing a front view of the left half of the blended wing-body aircraft shown in FIG. 5.

FIG. 6 illustrates the basic features of a "blended wing-body" aircraft. The body 40 contains passengers, crew and cargo. It is depicted as having a constant depth. A conventional outer wing 65 is connected to the body 40 by a transition section 47 that accomodates the change in depth from the outer wing 65 to the body 40.

Figure 7:
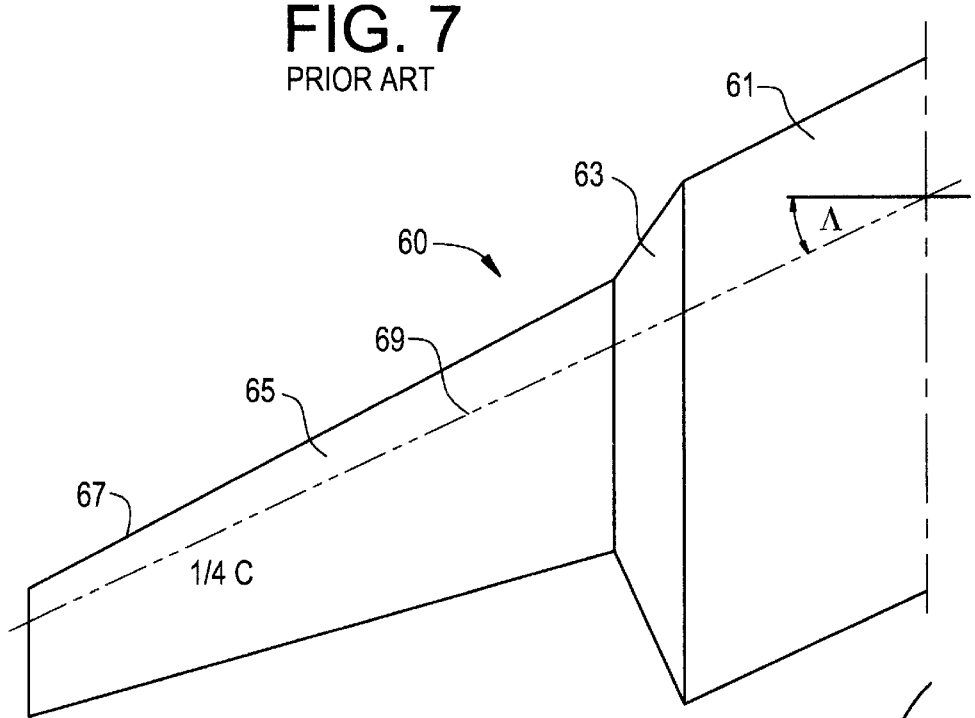
FIG. 7 is a schematic drawing providing a top view of the left half of a blended wing-body aircraft having a transition section which is not a transition section of the present invention.

To facilitate a better understanding of the advantages to be realized in the use of transition section 47 of the present invention, FIG. 7 provides a platform of one half of blended wing-body aircraft 60, which is a tailless aircraft that does not include the transition section of the present invention. The aircraft 60 includes body 61, transition section 63, wing 65, leading edge 67, and one quarter chord line 69. In conformance with conventional swept wing design, $\Lambda$ has a constant positive value across body 61, transition section 63, and wing 65. The chord length of the platform (parallel to the aircraft center line) is related approximately to the depths shown in FIG. 6. Hence, in the transition section 63, there is a rapid change in the chord length consistent with the change in depth.

In FIG. 7, the chord lengths are depicted as being disposed about a "quarter chord" reference datum. This datum is commonly used to represent the essential axis of a subsonic wing. This axis is depicted as having a constant sweepback angle $\Lambda$ along its span. Sweepback is commonly used to delay compressibility drag rise, to thereby allow aircraft to fly at high subsonic Mach speeds. Chord lengths of the body 61 are depicted as being constant.

A cut through the body 61 parallel to the aircraft center line would reveal an airfoil section. This airfoil encloses the cabin and is constant along its span. Hence, the body is a lifting section, replacing the non-lifting tubular fuselage of a conventional aircraft. The absence of a long fuselage, with balancing stabilizers, makes it much more difficult to maintain longitudinal balance. It is highly desirable to minimize the distances between the center of lift and the centers of gravity of the empty aircraft and that of the disposable payload (passengers, cargo and fuel). By doing this, more flexibility is provided to the airline in the manner in which payload can be loaded onto the aircraft without exceeding permissible center of gravity limits.

The aircraft depicted in FIG. 7 might typically have a center of payload forward of the center of lift. Balance could be improved by moving the outer wing 65 forward with respect to the body 61. However, any such movement disturbs the constant sweepback angle required for high subsonic flight.

FIG. 5 depicts how such a movement of the wing can be achieved, in accordance with the present invention, by allowing the sweepback in the transition section 47 to be reversed. The platform is depicted as having a negative sweepback equal to the positive sweepback in the outer wing and body segments. The particular geometry shown has a straight leading edge 49, but other geometries could be used depending on the particular balance requirements of the aircraft.

FIG. 4 depicts an aircraft 40 which employs the geometry features depicted in FIG. 5. The payload compartment is divided into segments 45 by a number of ribs running parallel to the aircraft longitudinal axis 53. Where the airfoil cross-section of the body 41 is constant, the segments 45 represent modular payload bays with identical geometries. In practice, the widths of the passenger bays and payload bays need not be equal.

Figure 8:
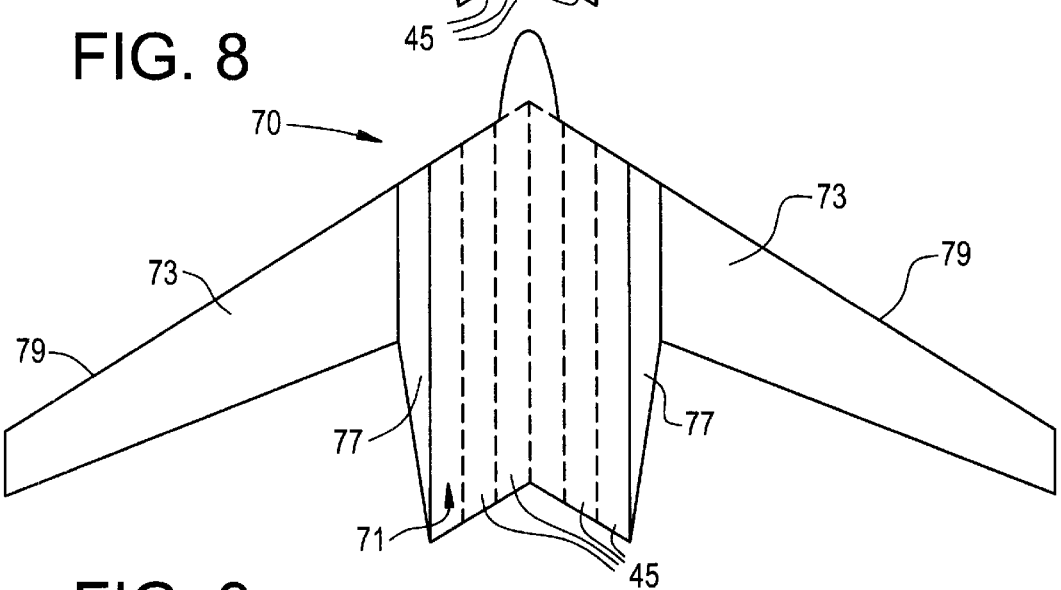
FIG. 8 is a schematic drawing providing a top view of a wide version of the blended wing-body aircraft shown in FIG. 4.
Figure 9:
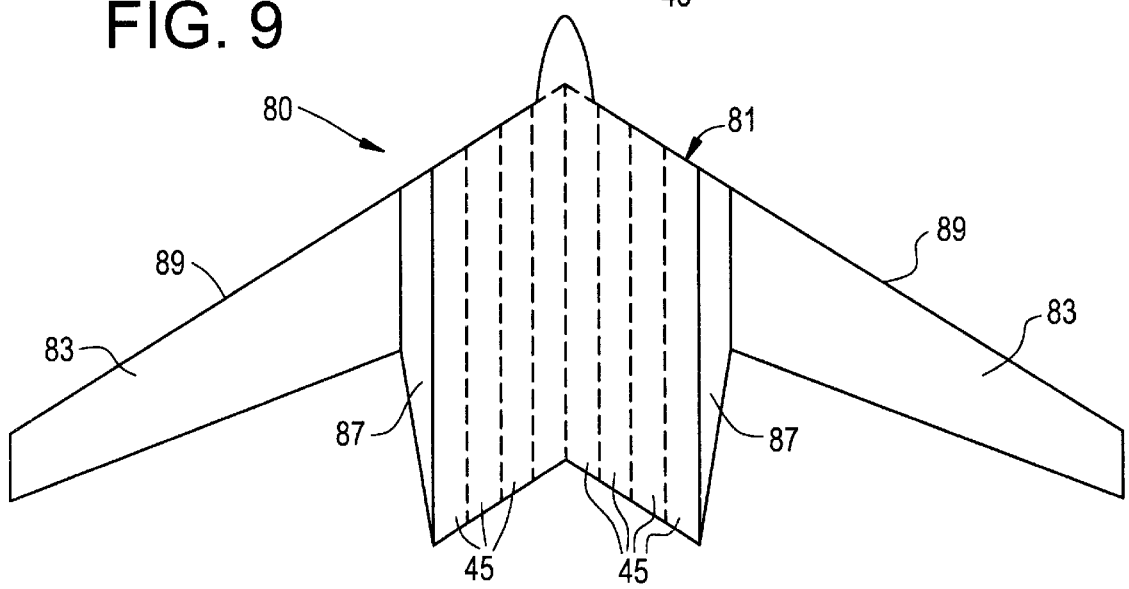
FIG. 9 is a schematic drawing providing a top view of a very wide version of the blended wing-body aircraft shown in FIG. 4.

The use of the transition section of the present invention would simplify the widening of the body of a basic blended wing-body aircraft. This would, in turn, greatly facilitate the development of a family of different sized tailless aircraft having differing load carrying capacities and ranges. FIGS. 8 and 9 depict how a family of aircraft might be implemented by successively adding payload modules on both sides of the baseline body.

In this connection, FIG. 8 is a schematic drawing providing a top view of blended wing-body aircraft 70, which is a wide body version of aircraft 40. Aircraft 70 is comprised of body 71, wing 73, transition sections 77, and leading edge 79. Body 71 is a wider version of body 41 of aircraft 40, and this additional width will require that it have added thickness relative to body 41 to provide additional strength and rigidity.

FIG. 9 is a schematic drawing providing a top view of blended wing-body aircraft 80, which is an even wider version of aircraft 40 than is aircraft 80. Aircraft 80 is comprised of body 81, wing 83, transition sections 87, and leading edge 89.

As evidenced by the different-sized aircraft 40, 70, and 80, the transition section of the present invention facilitates the relatively simple and straightforward modification of a blended wing-body aircraft design, thereby rendering feasible the creation of a family of models of varying sizes. In this family of aircraft, there is commonality of outer wing, transition zone, and baseline body components (apart from any structural resizing required to accomodate increases in aircraft weights). The added payload modules also have commonality with those within the baseline body component. This degree of commonality reduces fabrication costs, airline inventories, and maintenance costs. The extended nose containing the pilots compartment is also common, thereby reducing pilot training costs.

Although a presently preferred embodiment of the invention has been described in detail hereinabove, it should be clearly understood that many variations and/or modifications of the basic inventive concepts taught herein which may appear to those skilled in the pertinent art will still fall within the spirit and scope of the present invention as defined in the appended claims. In this regard, all figures are purely schematic. In practice, many changes might be incorporated for a variety of reasons. For example, the extended nose might be blended into the general lifting surface of the body. Engines, if located at the rearward end of the body, might modify the platform shape of the trailing edge. The drive to maximize aerodynamic performance and operating efficiency and the need to minimize weight might lead to variations from the idealized geometries depicted. These variations do not detract from the basic inventive concepts described hereinabove.

What is claimed is:

1. An aircraft, comprising:
   a wing having a positive sweep angle;
   a body having a positive sweep angle; and,
   a transition section interconnecting the wing and the body, said transition section having a span, a chord length varying across the span, a thickness varying across said span, and a sweep angle having a negative value across said span.

2. The aircraft as set forth in claim 1, wherein a leading edge extending from a tip of said wing to said body is linear.

3. The aircraft as set forth in claim 1, wherein a ratio obtained by dividing said chord length by said thickness for each location across said span, is constant across said span.

4. The aircraft as set forth in claim 1, wherein:
   said body is attached to said transition section at a body chord;
   said body chord has a body chord length and a body chord thickness;
   said wing is attached to said transition section at a wing chord;
   said wing chord has a wing chord length and a wing chord thickness;
   said transition chord length has values which vary across said span and lie between said body chord length and said wing chord length; and,
   said transition chord thickness has values which vary across said span and lie between said body chord thickness and said wing chord thickness.

5. The aircraft as set forth in claim 4, wherein:
   said body chord thickness is greater than said wing chord thickness; and,
   said body chord length is greater than said wing chord length.

6. The aircraft as set forth in claim 5, wherein:
   said transition section sweep angle has a magnitude approximately equal to a magnitude of said wing sweep angle.

7. The aircraft as set forth in claim 6, wherein the aircraft is a blended wing-body aircraft.

8. The aircraft as set forth in claim 7, wherein said negative value of said sweep angle is constant across said span.

9. The aircraft as set forth in claim 8, wherein said span is the distance taken along a constant one-quarter chord line, between said body chord and said wing chord.

10. An aircraft, comprising:

a wing having a positive sweep angle;

a body having a positive sweep angle;

a transition section interconnecting the wing and the body, said transition section having a span, a chord length varying across the span, a thickness varying across said span, and a sweep angle having a negative value across said span;

wherein a ratio obtained by dividing said chord length by said thickness for each location across said span, is constant across said span;

wherein said body is attached to said transition section at a body chord;

wherein said body chord has a body chord length and a body chord thickness;

wherein said wing is attached to said transition section at a wing chord;

wherein said chord has a wing chord length and a wing chord thickness;

wherein said transition chord length has values which vary across said span and lie between said body chord length and said wing chord length; and wherein said transition chord thickness has values which vary across said span and lie between said body chord thickness and said wing chord thickness.

11. The aircraft as set forth in claim 10, wherein:

said body chord thickness is greater than said wing chord thickness; and, said body chord length is greater than said wing chord length.

12. The aircraft as set forth in claim 10, wherein:

said transition section sweep angle has a magnitude approximately equal to a magnitude of said wing sweep angle.

13. A blended wing-body aircraft, comprising:

a pair of wings, each of said wings having a positive sweep angle;

a body having a positive sweep angle; and, a pair of transition sections interconnecting respective ones of the wings and the body, said transition sections each having a span, a chord length varying across the span, a thickness varying across said span, and a sweep angle having a constant negative value across said span.

14. The aircraft as set forth in claim 13, wherein:

said body is attached to said transition section at a body chord;

said body chord has a body chord length and a body chord thickness;

said wing is attached to said transition section at a wing chord;

said wing chord has a wing chord length and a wing chord thickness; said transition chord length has values which vary across said span and lie between said body chord length and said wing chord length; and, said transition chord thickness has values which vary across said span and lie between said body chord thickness and said wing chord thickness.

15. The aircraft as set forth in claim 14, wherein:

said body chord thickness is greater than said wing chord thickness; and, said body chord length is greater than said wing chord length.

16. The aircraft as set forth in claim 15, wherein a ratio obtained by dividing said chord length by said thickness for each location across said span, is constant across said span.

17. The aircraft as set forth in claim 13, wherein first and second leading edges extend from respective tips of said wings to said body, and each of said first leading edge and said second leading edge is linear.

18. The aircraft as set forth in claim 13, wherein:

the transition section sweep angle of each transition section has a magnitude approximately equal to a magnitude of the wing sweep angle of the wing connected to the respective transition section.

19. The aircraft as set froth in claim 13, wherein said body has a payload compartment divided into segments by a plurality of ribs extending parallel to the aircraft longitudinal axis, and where said body has a constant air-foil cross-section said body comprises modular payload bays having identical geometries.

20. The aircraft as set forth in claim 13, further comprising a thrust generating means consisting of one or more engines mounted only at the aft end of the body.

* * * * *